United States Patent
Keramidis

(10) Patent No.: US 8,162,574 B2
(45) Date of Patent: Apr. 24, 2012

(54) VEHICULAR CARGO RETENTION SYSTEM WITH SLIDING ENGAGEMENT

(76) Inventor: Bill V. Keramidis, Estes Park, CO (US)

( * ) Notice: Subject to any disclaimer, the term of this patent is extended or adjusted under 35 U.S.C. 154(b) by 411 days.

(21) Appl. No.: 12/357,301

(22) Filed: Jan. 21, 2009

(65) Prior Publication Data

US 2009/0202315 A1 Aug. 13, 2009

Related U.S. Application Data

(60) Provisional application No. 61/021,792, filed on Jan. 17, 2008.

(51) Int. Cl.
*B60P 7/08* (2006.01)
(52) U.S. Cl. ............. 410/38; 410/34; 410/143; 410/129
(58) Field of Classification Search ............ 410/34, 410/35, 38, 39, 40, 129, 143, 151; 248/316.1, 248/229.1, 500; 224/403, 533, 536, 42.38, 224/558, 567, 570; 206/451
See application file for complete search history.

(56) References Cited

U.S. PATENT DOCUMENTS

| | | |
|---|---|---|
| 7,515 A | 8/1850 | Drake |
| 710,639 A | 10/1902 | Vickers |
| 1,644,279 A | 10/1927 | Romine |
| 2,855,217 A | 10/1958 | Bagwell |
| 3,446,515 A | 5/1969 | Julian |
| 4,121,849 A | 10/1978 | Christopher |
| 4,236,854 A | 12/1980 | Rogers |
| 4,507,033 A | 3/1985 | Boyd |
| 4,650,383 A | 3/1987 | Hoff |
| 5,338,136 A | 8/1994 | Hetchler |
| 5,427,487 A | 6/1995 | Brosfske |
| 5,697,742 A | 12/1997 | House |
| 5,800,145 A | 9/1998 | Kelce |
| 5,839,865 A | 11/1998 | Schmidt |
| 5,865,580 A | 2/1999 | Lawrence |
| 5,971,685 A | 10/1999 | Owens |
| 6,068,433 A | 5/2000 | Baloga |
| 6,168,359 B1 | 1/2001 | Smith |
| 6,193,452 B1 | 2/2001 | Skiba |
| 6,227,781 B1 | 5/2001 | Smith et al. |
| 6,471,455 B2 * | 10/2002 | Skiba ............................. 410/38 |
| 6,582,169 B1 | 6/2003 | Cano-Rodriguez et al. |
| 6,632,055 B2 | 10/2003 | Kania |
| 6,830,418 B2 | 12/2004 | Keramidis |

* cited by examiner

*Primary Examiner* — Stephen Gordon
(74) *Attorney, Agent, or Firm* — Santangelo Law Offices, P.C.

(57) ABSTRACT

A system including apparatus and methods for compressively retaining cargo to a vehicular or other surface may, after an initial "rough" adjustment, allow for the operation of a compression force enhancement element to enhance a compression force through relative sliding movement and so that cargo may be retained as intended. Aspects of the inventive technology may relate to the allowance for one-handed manipulation of the compression force enhancement element (e.g., a rotatable lever) through perhaps less than one-quarter of a rotation in order to enhance the compression force.

20 Claims, 12 Drawing Sheets

VEHICULAR CARGO RETENTION SYSTEM WITH SLIDING ENGAGEMENT

This application claims priority to and the benefit of U.S. Provisional Patent Application No. 61/021,792 filed Jan. 17, 2008, hereby incorporated by reference herein.

I. BACKGROUND OF THE INVENTION

Generally the inventive technology relates to retaining cargo such that it does not move relative to a supporting surface, such as a cargo bed of any size, make, or model pick-up truck, or other vehicular surface. Embodiments can be used with or without the use of a canopy or any other type of cover. Specifically, the inventive technology focuses upon the use by people in the construction business or any other persons who use their pick-up trucks or vehicle for any other type of cargo, transport. Further, at least one embodiment of the invention relates to an easily installable and removable vertical compression force-based vehicular cargo retention apparatus that may be fully adjustable to accommodate cargo of different size and to fit vehicles with differently sized cargo beds or surfaces.

Possibly one of the biggest problems in transporting cargo may be that there may, from some perspectives, be no product sufficiently strong, secure, and as easy to use, especially for those in the construction field, to effectively hold down cargo in the bed of a pick-up truck without causing damage to the materials being held down (generally the cargo) or to the vehicle. As examples, problems can exist with cargo hold down/supports while driving down the highway or any drivable surface.

After one sees broken drywall and other building materials, or even Christmas trees, as but a few examples, on the road which have blown off the back of trucks, the importance of securely retaining and transporting cargo is readily apparent. A few specific examples of problems in vehicularly transporting cargo include damage to cargo resulting from movement of cargo relative to the cargo supporting surface, damage to supporting surfaces or other vehicle parts incurred due to motion of cargo relative to supporting or surrounding structural surfaces, impairment of vehicular maneuverability and speed due to a vehicle operator's insecurity as to the integrity of the cargo securing (or retention) apparatus at higher speeds or at sharper curves, for example, and increased risk of damage and injury to persons and property proximate to an insufficiently or improperly retained cargo transport operation (including increased risk of incurring legal liability to injured parties or property owners). Cargo merely confined, as in some commercially available systems, may not be sufficiently retained without proper compressive force application to the cargo. Other problems relate to costs of presently commercially available cargo hold down apparatus that are prohibitively high for, for example, individual vehicle owners who desire to transport and safely retain smaller amounts of cargo. Still other problems with presently commercially available vehicular cargo retention products has to do with an installation that requires bolting or potentially deforming clamping, e.g., of the product to a vehicle part.

II. SUMMARY OF THE INVENTION

In at least one embodiment, the invention may disclose a structural framework system that may be used to retain through a vertical compression force items (more generally cargo) for transport. It may disclose a substantially elongated and rigid upper bar (a type of vertical compression force base element), two vertical compression force transfer elements, a cargo retention element and a compression force enhancement element that may allow for quick compression by—and release of—the apparatus. Indeed, in some embodiments, in order to "depressurize" the apparatus so that it can be removed (from, e.g., a truck bed), all that may be required is "de-activation" of the compression force enhancement element. The apparatus may engage a vehicle such as, for example, a pickup truck. In at least one embodiment of the invention, the vertical compression force is what results in secure cargo retention. In at least one embodiment, engagement elements each frictionally engage an underside of a truck bed sidewall upper lip underside through a compressive force.

This device offers advantages in transporting cargo in the bed of a pick-up truck, or on or in a supporting surface of any other type of vehicle. In a basic form, one broad goal of the concept or device involves taking any number, any size, any weight, or length of items (generally known as cargo) such as, but not limited to, drywall, PVC pipe, paneling, boards and equipment such as ladders scaffolding and household appliances, or even a tree (as but a few examples), and protecting them from flying, falling, or tipping over or out of the bed of the truck, or sustaining any unwanted motion relative to the cargo supporting surface (a pickup truck bed, e.g.). Of course, the term vehicular cargo as may be used herein refers generally to cargo being supported and transported with a vehicle.

Aware of the possibility of bodily injury due to a vehicle accident, the liability that it could cause, the loss or damage of expensive materials, equipment, or other items loaded and not held down securely, the inventive apparatus and methods disclosed and claimed herein present a better manner in which to transport and hold cargo in place in a truck bed without damaging the truck and without the loss or damage of the items being transported. The apparatus could prevent motion of the cargo relative to the cargo supporting surface from occurring by vertically compressively supporting and holding down or bracing (in effect, retaining) cargo in the back of a pick-up truck, thereby precluding or avoiding injury to persons and/or damage to property.

Another broad goal of the cargo hold-down apparatus (at times referred to as the device or invention) is to prevent damage to the top of the tailgate from items too long for the truck bed, as the device can be used with the tailgate down.

Another broad goal of the inventive technology may be to provide a cargo retention unit that may be installed without bolting or clamping, each of which may result in permanent structural modification of the vehicle.

Another broad goal of the inventive technology may be to provide a vehicular cargo apparatus that is quickly "depressurized" from its retention configuration so as to be readily removable (e.g., without manipulation of nuts or bolts) from a vehicle. Such removal may, in at least one embodiment, be possible after manipulation (e.g., one-handed manipulation) of only one part such as a lever.

Another broad goal of the inventive technology may be to provide a quick retention capability (e.g., by one-handed operation of a lever) after "rough" setup is achieved.

Another broad goal of the inventive technology may be to provide a vehicular cargo apparatus that is quickly reconfigured from an approximate retention mode (an apparatus configuration observed after a "rough" setup is achieved) to a retention mode (an apparatus configuration observed after the compression force upon the cargo is enhanced). Such quick reconfiguration may be achieved with one hand and/or upon manipulation of a lever (e.g., less than ¼ turn, in at least one embodiment).

Naturally, further objects of the invention are disclosed throughout other areas of the specification and claims.

III. BRIEF DESCRIPTION OF THE FIGURES

Figure 12:
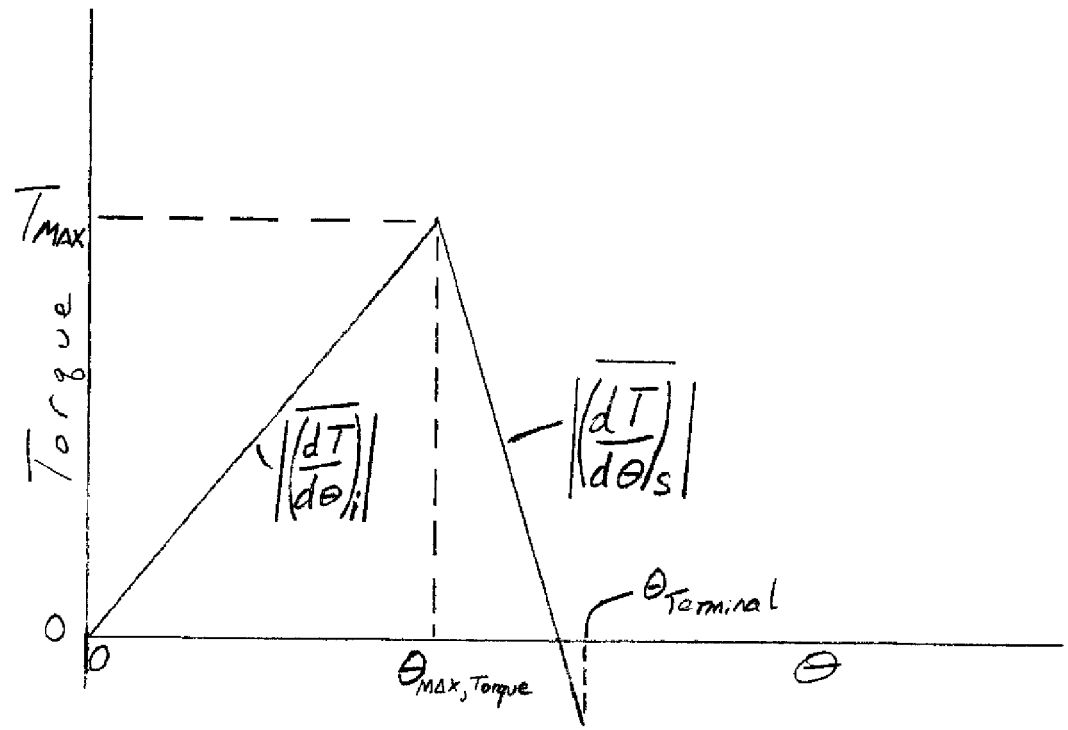
Figure 13:
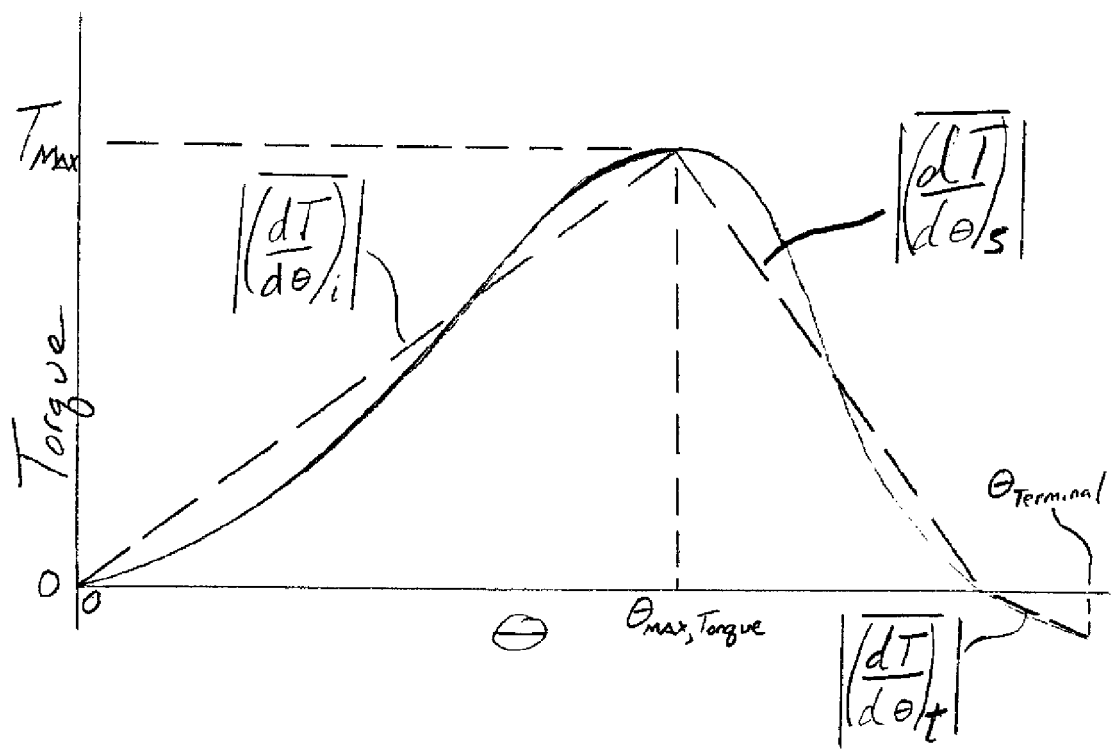

FIG. 12 and FIG. 13 each show a graph of but two of many different varying torques profiles, for different embodiments, experienced by an operator of the compression force enhancement element when moving a part thereof (e.g., a lever) from a free position to a locked position.

IV. DETAILED DESCRIPTION OF THE PREFERRED EMBODIMENTS

The present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In at least one embodiment of the inventive technology, a vehicular cargo retention apparatus 1 may comprise two engagement elements 2 that each are configured to respond to at least one vehicle part (e.g., two truck bed sidewall upper lips 3 (e.g., lip undersides)); a vertical compression force base element 4 responsive to each of the two engagement elements; two adjustable releasable vertical compression force transfer elements 5, each pressuredly responsive to the vertical compression force base element; a vertically compressive cargo retention element 6 pressuredly responsive to each of the adjustable releasable vertical compression force transfer elements; and a vertical compression force enhancement element 7 to which the vertically compressive cargo retention element is compressively responsive.

The at least one engagement element may engage a part of the vehicle such as the upper lip of a truck bed sidewall with, e.g., a clamp; by engage is meant generally not move relative to in at least one direction. The engagement element may also engage a different vehicle part, such as the underside of a flat bed trailer, e.g. The engagement element of the basic apparatus may be at least one frictional engagement element and/or a clamp engagement element (a general term for what may in at least one embodiment be part 8). Either may be a truck bed sidewall upper lip engagement element, as but one example. A frictional engagement element engages due to friction arising from pressure between oppositional forces pointing away from one another. Other types of engagement may include bolts, bolting, strapping, and adhesive, e.g. The engagement element may also simply be at least one truck bed sidewall engagement element.

Figure 1:
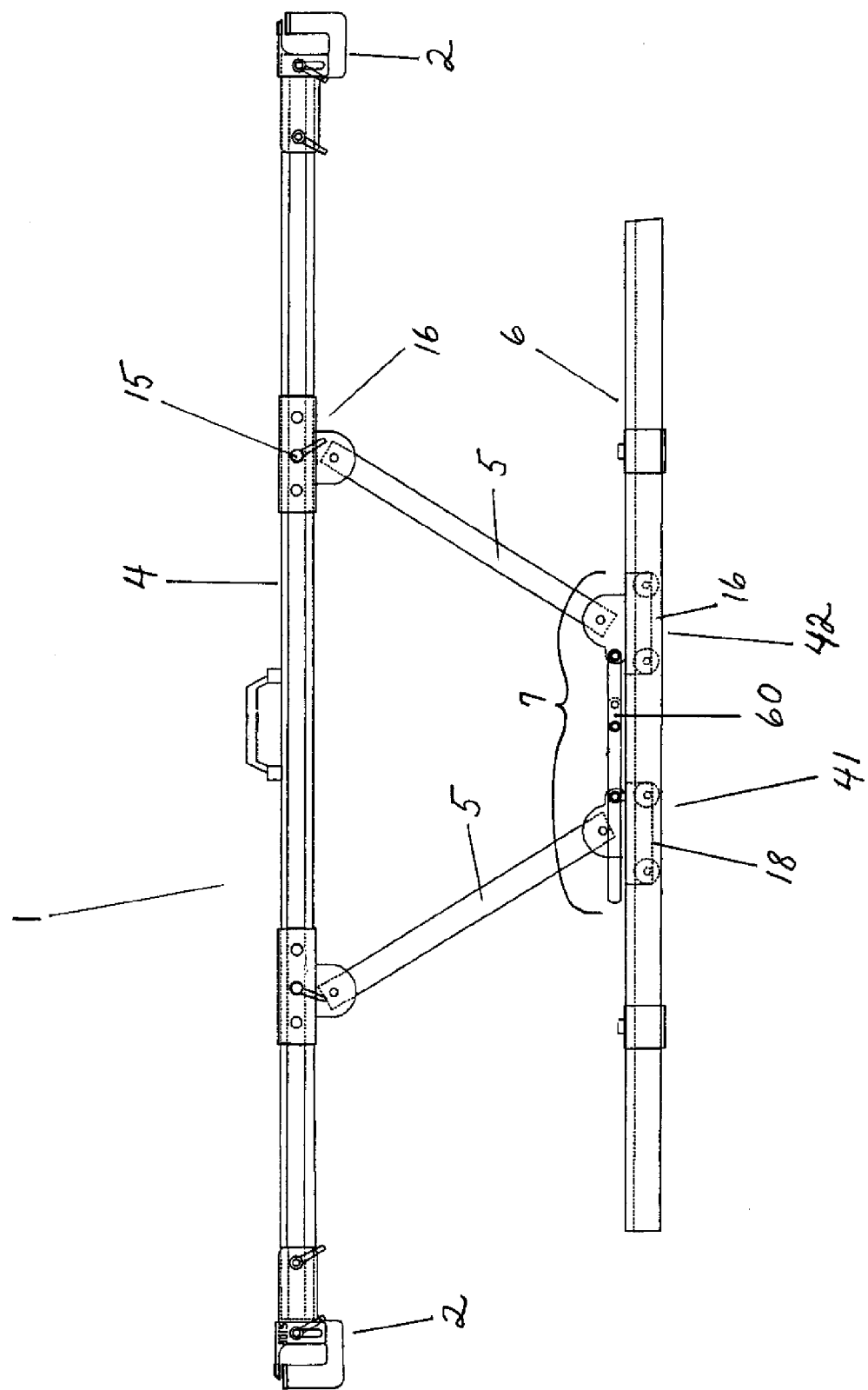
FIG. 1 shows an embodiment of the inventive apparatus in a retention mode position (for purposes of clarity, the vehicle with which it may be engaged is not show).
Figure 2:
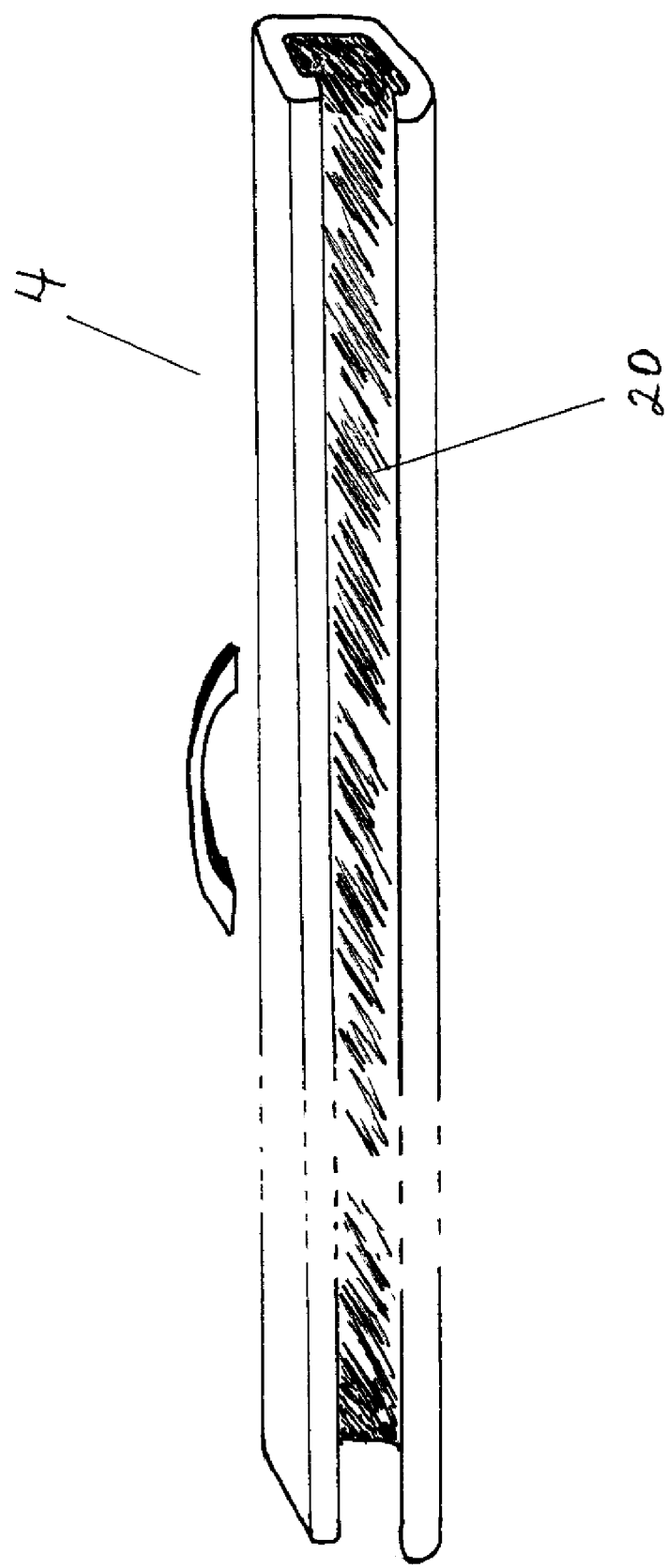
FIG. 2 shows one example of a compression force base element.
Figure 3:
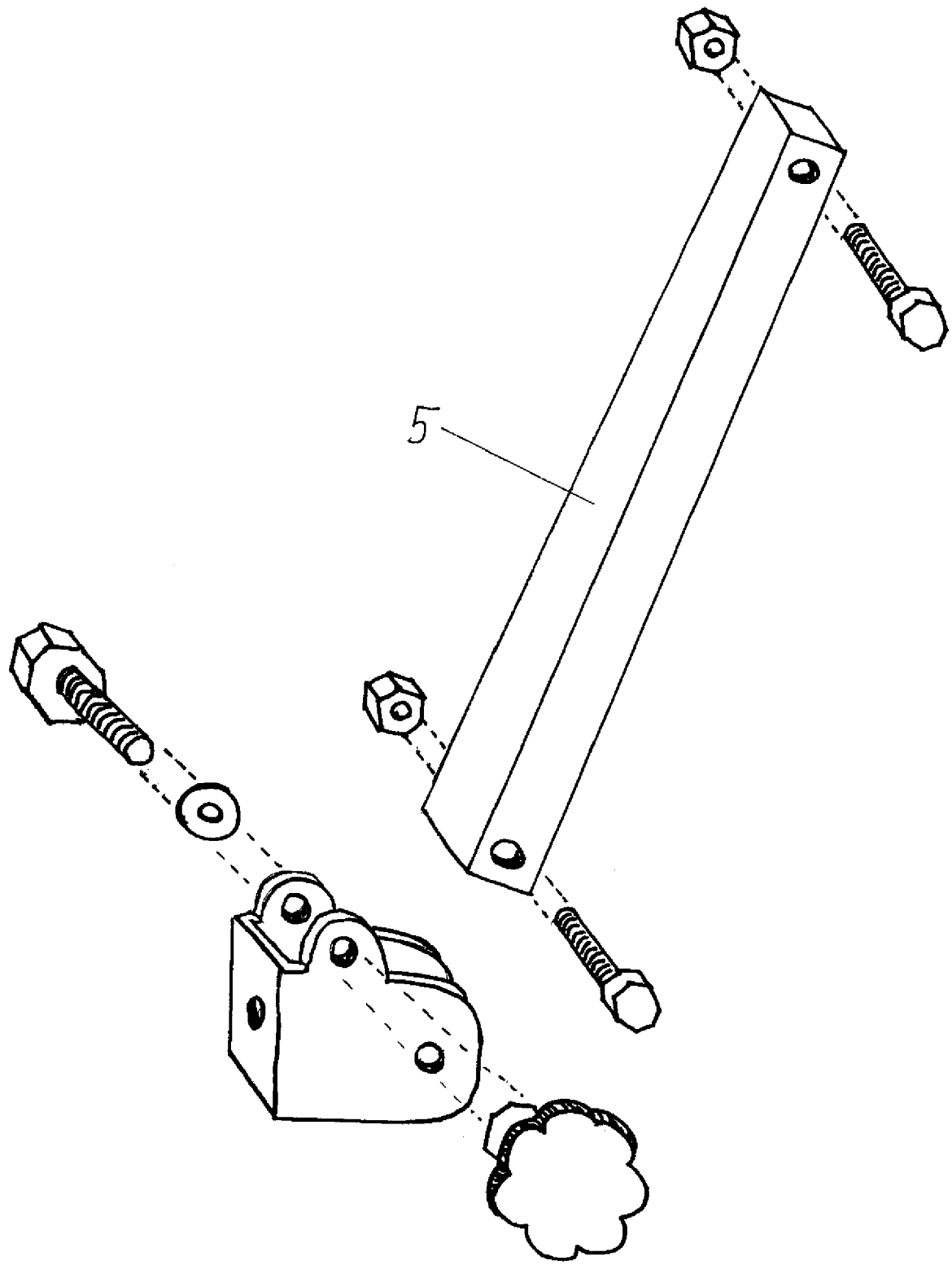
FIG. 3 shows an example of each a compression force transfer element and a pivotal connector (including connectors), which, although shown at only one portion of the transfer element, may appear at another portion (e.g., an opposite end).
Figure 4:
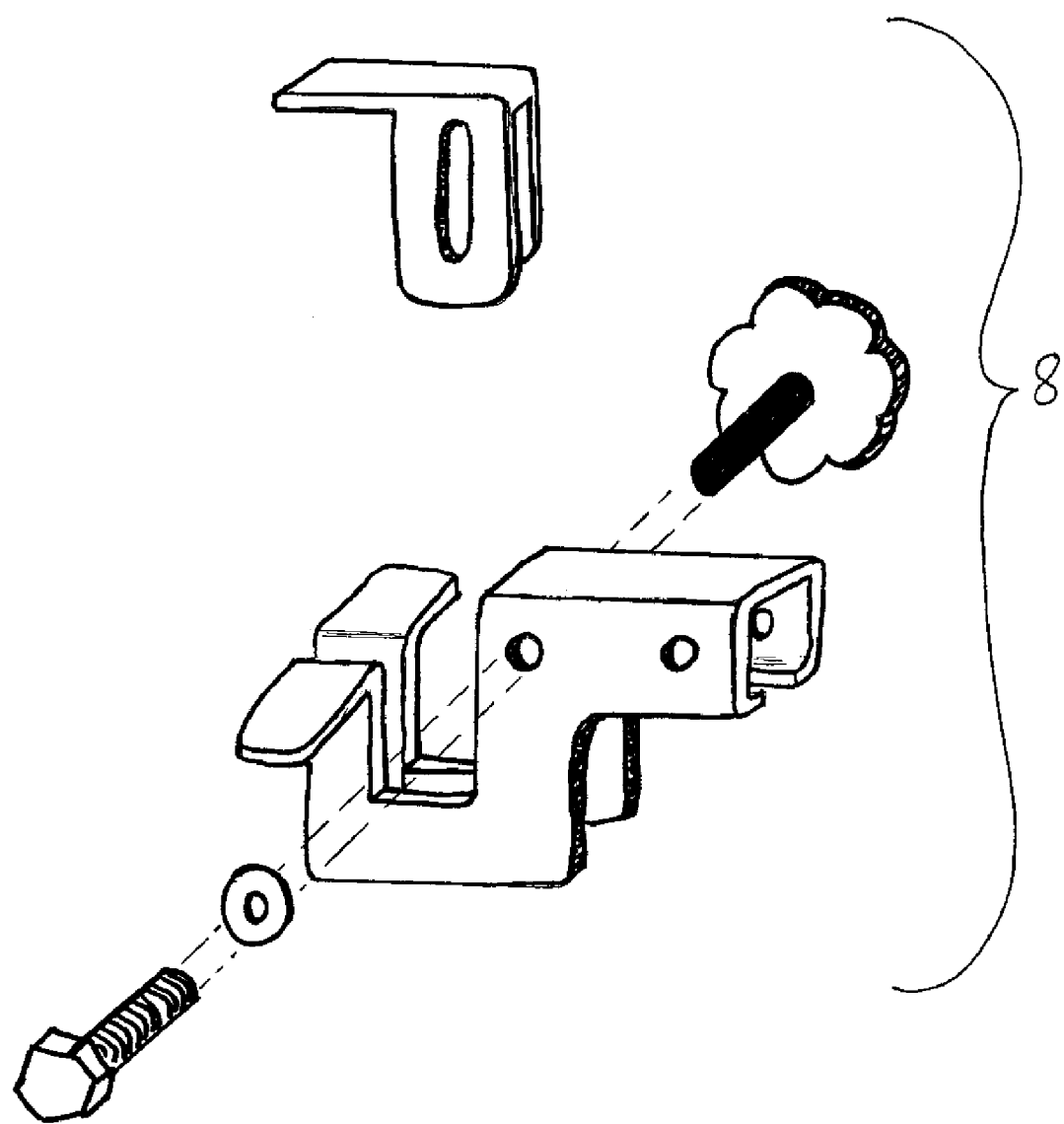
FIG. 4 shows an example of a clamp engagement element.
Figure 5:
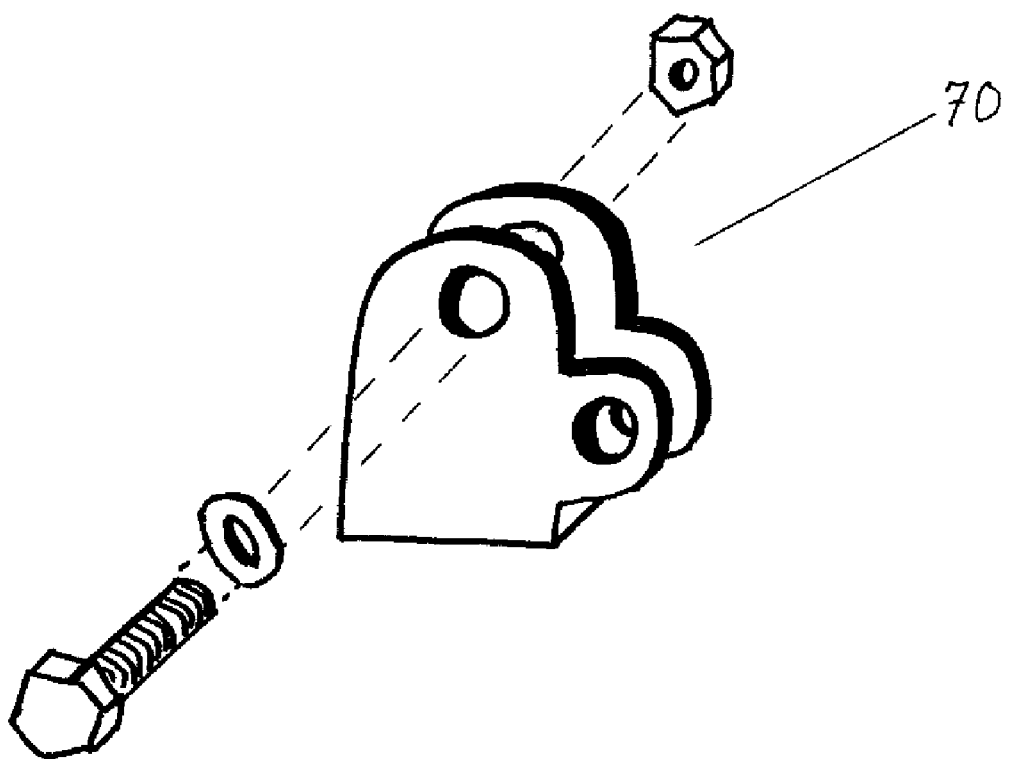
FIG. 5 shows an example of a pivotal connector.

The vertical compression force base element may be as part 4 in FIG. 1, e.g. The vertical compression force base element and the releasable vertical compression force transfer element could possibly be one in the same in at least one embodiment of the invention, although in a preferred embodiment they are different; the engagement element will always be a separate part because its definition encompasses even simply surfaces of other elements that contact or in some way engage a vehicle part. The vertical compression force base element may be viewed as a foundation of the invention's framework and may play a key role in providing and maintaining the compressive force that retains cargo. The releasable vertical compression force transfer element may be a structure that, at least conceptually, may transfer a vertical compression force from the base element to the vertically compressive cargo retention element. It may be termed releasable because the force that it transfers (and maintains) may be eliminated upon manipulation (e.g., deactivation) of the vertical compression force enhancement element, for example. It is this releasability that allows for "depressurization" of the apparatus and the eventual removal of the cargo.

The vertically compressive cargo retention element may compressively contact the cargo against an underlying surface such as a truck bed 10, thereby compressively retaining it. The vertical compression force enhancement element may allow for the provision of vertical compression force that is beyond that which might otherwise be provided (e.g., after "rough" setup of the apparatus, by gravity alone). This extra compression may be necessary to sufficiently retain cargo 11 during transport.

The vertical compression force base element of the basic apparatus may be a substantially straight base element (see FIG. 1), or, instead, the base element might not be straight (it may be elevated at perhaps a middle section in order, perhaps, to avoid obstacles. Note that the term substantially indicates that designs that vary slightly (or even more than slightly) may be considered within the ambits of the coverage afforded by the limitation. The term substantially may be "read into" limitations even where the term is not explicitly mentioned.

The vertical compression force base element of the basic apparatus may be an extendable (or length-adjustable) vertical compression force base element (a general term for what may in at least one embodiment as shown in FIG. 1), which maybe a positionally lockable length-adjustable vertical compression force base element. Such extension or length adjustment allows for use of the apparatus on vehicles having varying cargo transportation surface widths (such as the varying widths of differently sized pickup truck beds; note that the term length-adjust refers to the length of the element being adjusted and not the length or width of the truck bed). Positionally lockable refers to a capacity to be "locked" or secured in a repositioned configuration (e.g. a repositioned length).

As a goal of at least one embodiment of the inventive technology is to provide a fully adjustable cargo retention apparatus, in a preferred embodiment, each the compression force enhancement element and the adjustable releasable vertical compression force transfer elements are laterally adjustable (although such is not be a required feature of the inventive technology). Such adjustment may be allowed for by sliding engagement of specific parts. The adjustable releasable vertical compression force transfer elements may each be lockable in a desired position relative to the vertical compression force base element, or relative to the vertically compressive cargo retention element.

The at least one releasable vertical compression force transfer element of the basic apparatus may be at least one adjustable releasable vertical compressive force transfer element (a general term for what may in at least one embodiment be as shown in FIG. 1). This at least one adjustable releasable vertical compressive force transfer element may help to allow for what may be referred to as rough setup of the apparatus; essentially the adjustable force transfer elements may be manipulated (perhaps by sliding a certain portion of each of them either away from or towards another in another apparatus part) to positionally adjust the cargo retention element above or on top of cargo to be retained so that a compression force enhancement element may be subsequently manipulated to retain the cargo with an enhanced compression force. For such manipulation to effect an enhanced compression force, it may be necessary that the engagement elements engage the truck sidewall (e.g., a sidewall upper lip) so that a force can indeed be generated and applied upon operation of the force enhancement element.

Figure 6:
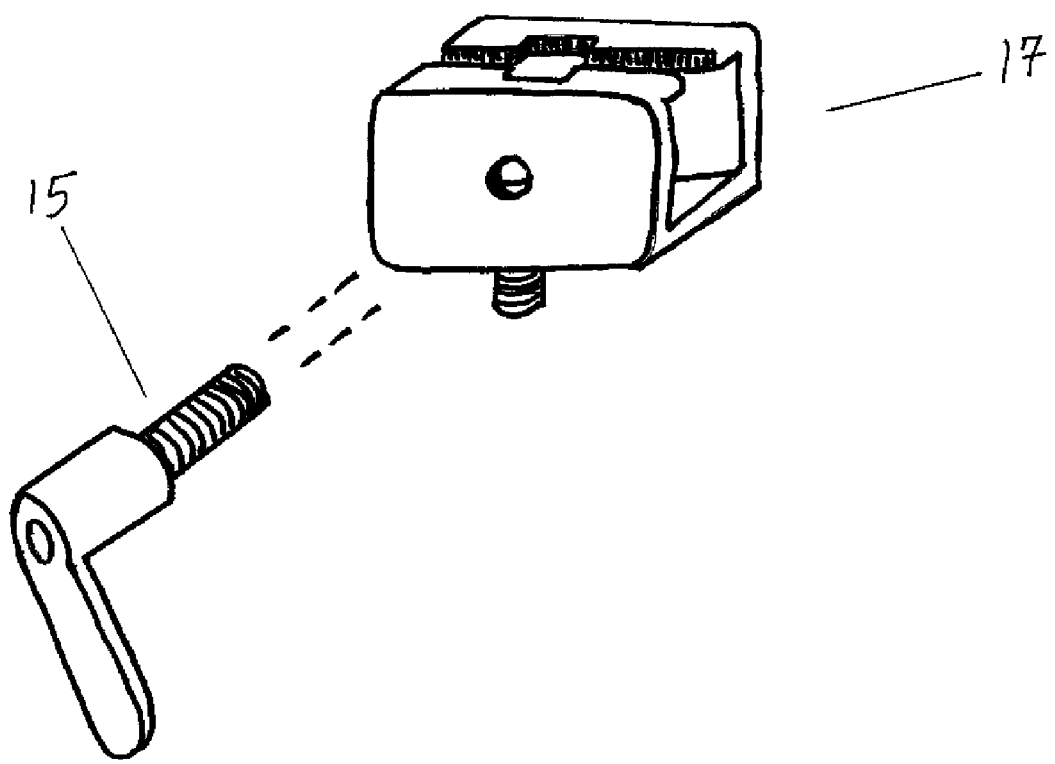
FIG. 6 shows an example of a slide element (particularly, an example of a glide slide element).
Figure 7:
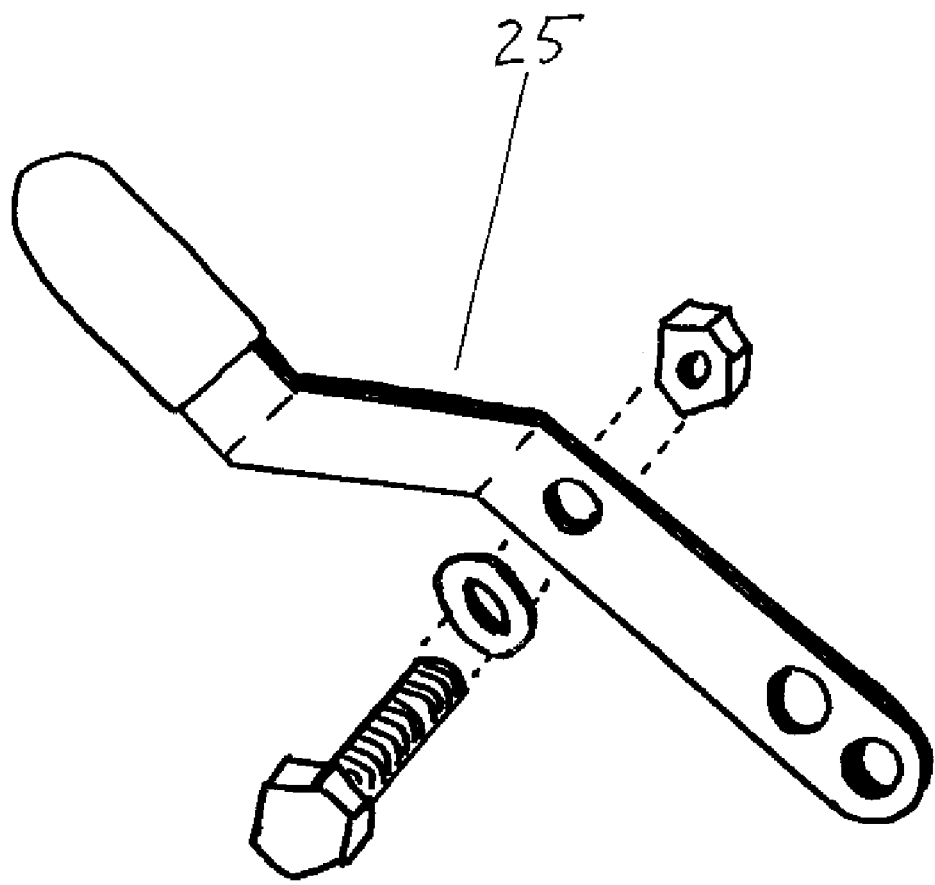
FIG. 7 shows an example of a lever of a compression force enhancement element (in addition to connectors).
Figure 8:
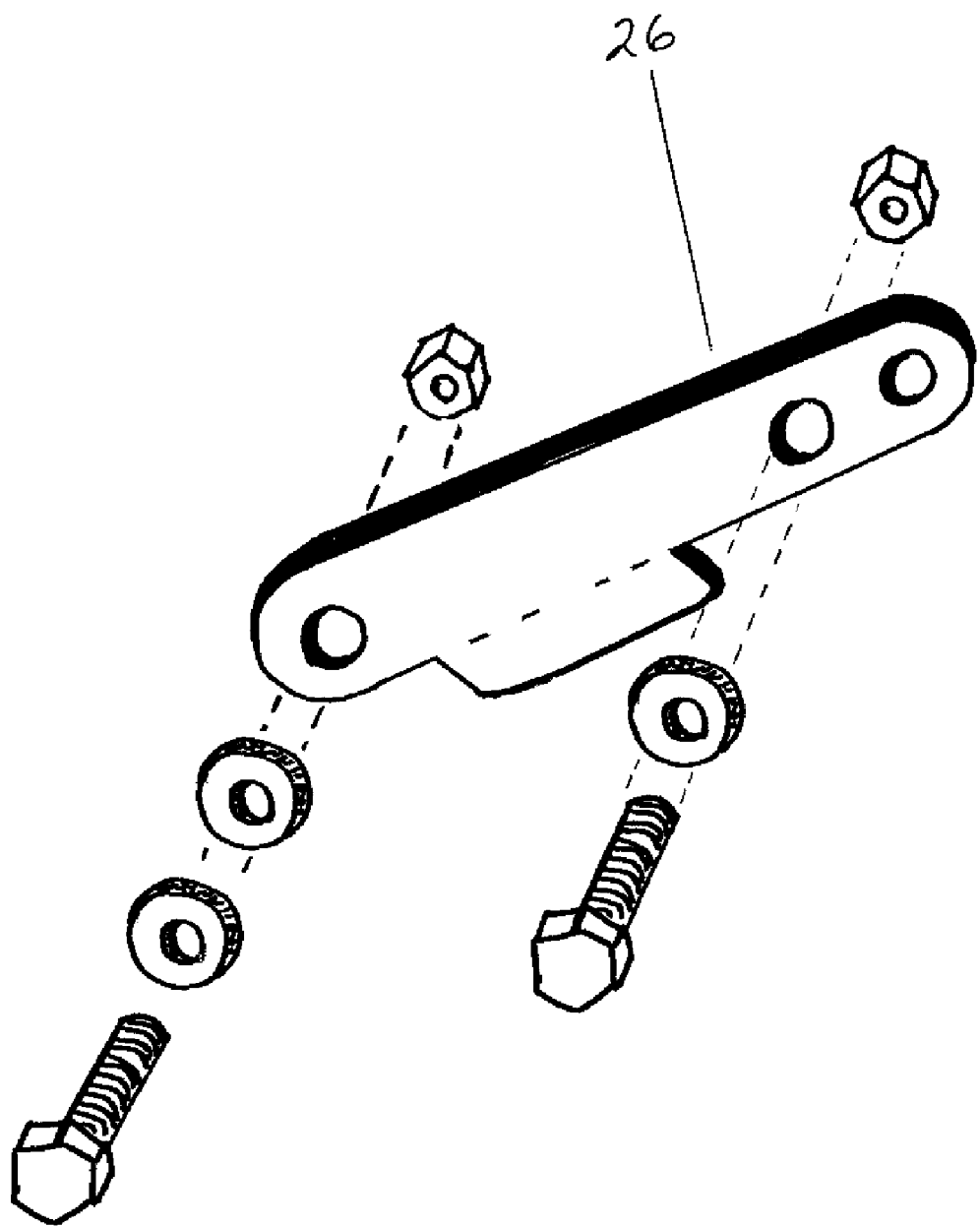
FIG. 8 shows an example of that part nominated "member" of the compression force enhancement element.
Figure 9:
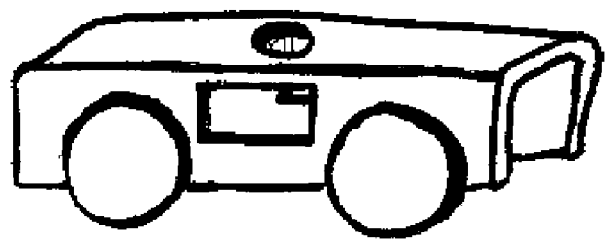
FIG. 9 shows an example of a wheeled slide element.
Figure 10:
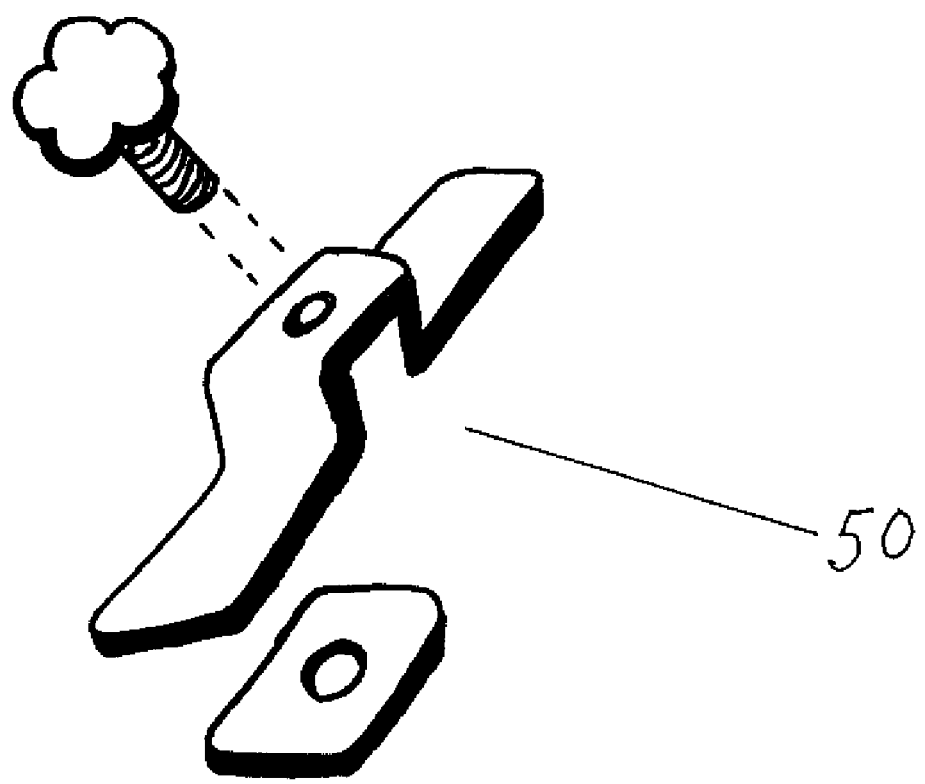
FIG. 10 shows one example of a cargo retention foot.

Further, such manipulation of the compression force enhancement element to enhance a compression force after "rough" adjustment of the apparatus (see, e.g., FIG. 11) might only be possible after the portion of each of the force transfer elements that are slid (either away from one another or towards one another) in another apparatus part are laterally immobilized (perhaps with a lateral immobilization device such as a set screw 15). Such sliding capability may be provided, at least in part, by a slide element 16 (e.g., a slide carriage 17 or slide cart 18) that can slide, perhaps horizontally, and perhaps along a guide 20 (whether inside, outside or both). Such guide (e.g., a track) may be provided, at least in part, by the force base element, or the cargo retention element. Each slide element may be either a wheeled slide element (see, e.g., FIG. 9) or a glide slide element (see, e.g., FIG. 6), as but two examples. Wheeled slide elements may include ball bearings, or any other type of wheel, while glide slide elements include all types of non-wheeled slide elements.

In at least one embodiment of the inventive technology, the force transfer elements may slidingly engage (each at one portion such as an end) the cargo retention element such that they can be slid together as a unit (i.e., with little or no relative motion between them during such sliding) before any lateral immobilization of different portions of the force transfer elements that engage, e.g., the compression force base element. Such adjustment may enable better retention of cargo of different widths and/or creates a better fit of the cargo retention element with the cargo supporting surface and/or enables the avoidance of obstacles that otherwise might make retention with the apparatus difficult. It should be noted that in preferred embodiments, sliding engagements are horizontal sliding engagements (such that engaged parts horizontally, slidingly engage).

The at least one compression force enhancement element of the basic apparatus may assume several different configurations, each described by the broad term compression force enhancement element, although a preferred design includes a rotatable lever 25 that is pivotally connected to each: a member (e.g., 26, connected at a non-terminal portion of the lever); and an end of one of the force transfer elements (see FIG. 11)). The lever and the member may be configured (e.g., by properly positioning their points of pivotal connection) such that, when the enhancement element is in a free position and resting under the force of gravity, the lever and the member centerlines 27, 28 respectively define two angles—a first angle (e.g., 30) that is between 90 and 180 degrees, and a second angle (e.g., 31) that maybe substantially 360 degrees minus the first angle. For purposes of clarity, it is noted that whenever a member is not straight along its entire length, its centerline is defined as that line passing through points at the centroid of each end thereof. In a preferred embodiment, the first angle is between 160 and 180 degrees. It should be noted that it is the first angle that increases during manipulation of the compression force enhancement element to enhance the compression force.

The vertical compression force enhancement element slidingly engages a structural part of the apparatus at at least one site; in a preferred embodiment, the vertical compression force enhancement element slidingly engages a horizontally disposed structural part (e.g., the cargo retention apparatus) at two sites 41, 42. By slidingly engage is meant some sort of connection between the engaged parts that prevents relative motion in at least one direction while allowing sliding motion of one part relative to the other part in a different direction. A screw is deemed not to allow sliding motion, as pushing on a screw in a certain direction does not effect a sliding motion in that direction.

Figure 11:
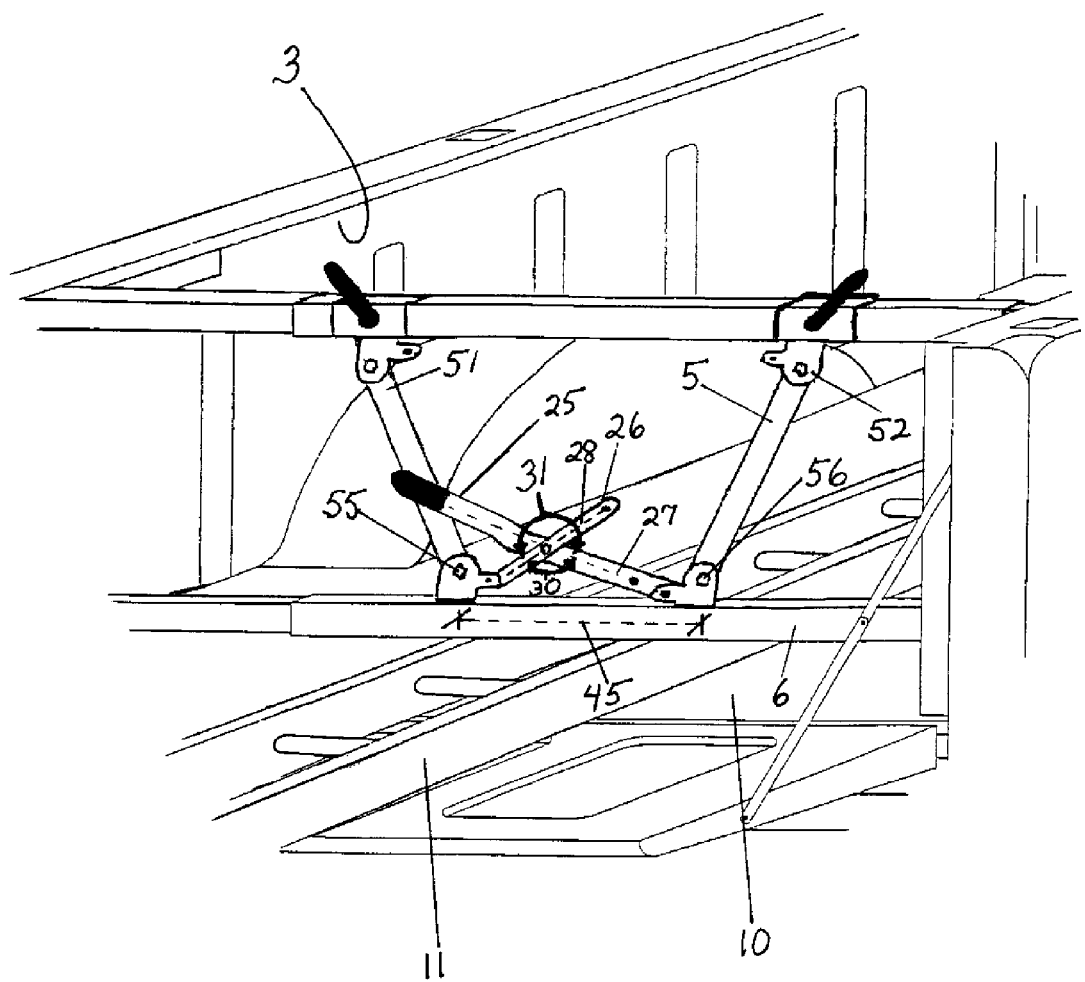
FIG. 11 shows an embodiment of the inventive apparatus as positioned above cargo in the bed of a pickup truck.

The structural part that the vertical compression force enhancement element may slidingly engage may be either the vertically compressive cargo retention element (as in the preferred embodiment as shown in FIG. 11) or the vertical compression force base element. Further, it should be noted that in at least one embodiment, the vehicular cargo retention apparatus, after being fixedly established to the vehicle (while still being easily removable, perhaps), can be disengaged from the vehicle upon manipulation of the vertical compression force enhancement element to remove a vertical compression force that retains cargo.

The vertical compression force enhancement element may be a leveraged force enhancement element and, in a preferred embodiment, is operable with one hand (as is the case with the apparatus of FIG. 1). Further, in a preferred embodiment, during manipulation of the vertical compression force enhancement element to enhance a vertical compression force applied to the cargo by the vertically compressive cargo retention element, the vertically compressive cargo retention element does not move laterally relative to vehicular cargo. The compression force enhancement element, upon activation, may, in at least one embodiment, reflect an increase in a lateral distance (e.g., separation distance 45) between two sites at which the two adjustable releasable vertical compression force transfer elements are engaged (to, e.g., the retention element).

The vertically compressive cargo retention element of the basic apparatus may be a frictional material bottom-coated cargo retention element. A texturized hard rubber strip coating is one example of a frictional material that may be sufficient to enhance cargo retention. The vertical compression force cargo retention element may also be an elongated squared hollow metal cargo retention element. The basic apparatus may further comprise rubber coating over at least a portion of exposed metal parts to mitigate rust formation, for example. Further, the cargo retention element might include cargo retention feet (e.g., 50).

At least one method embodiment of the inventive technology may comprise the steps of engaging a vertical compression force base element with at least one vehicle part (e.g., a truck bed sidewall upper lip, including an underside of such lips); establishing a vertically compressive cargo retention element upon vehicular cargo; establishing a first portion (e.g., first ends, such as an upper 51, 52 or lower end) of each of two adjustable releasable vertical compression force transfer elements in retention mode lateral positions (i.e., the lateral positions that they will be in after the apparatus is reconfigured from an approximate retention mode configuration as in FIG. 11 to a retention mode configuration as in FIG. 1, where lateral refers to the position along the element with which they are engaged). This may be accomplished by sliding such first portions along the first apparatus part (e.g., a compression force base element or a cargo retention element). Additional steps may involve: laterally immobilizing such first portions in their retention mode lateral positions (e.g., respective lateral retention mode positions) so as to prevent lateral movement along such apparatus part and enable compressive force enhancement; and rotating a lever less than one-half (e.g., less than one quarter) of a turn from a free position (as shown in, e.g., FIG. 11) to a locked position (as shown in, e.g., FIG. 1), to increase, by relative sliding, the separation distance between second portions (e.g., ends 55, 56) that are opposite the first portions) of the two adjustable releasable vertical compression force transfer elements. "Free position" indicates that movement in at least one direction is unopposed (except by perhaps gravity). Such lever manipulation may effectively enhance a vertical compression force acting upon the vehicular cargo and maintain such enhanced vertical compression force.

The term second portions refers to portions that are different from the first portions; in a preferred embodiment, each such portion is an end of the force transfer elements (the first portion would be one end—an upper or lower end—while the second portion would be an opposite end—a lower or an upper end, respectively). The first portions may be slidingly adjustable along a first apparatus part (the vertical compression force base element, as but one example) while the second portions may be slidingly adjustable along a different apparatus part (a second apparatus part, such as the vertically compressive cargo retention element, as but one example). In certain embodiments, where the first apparatus part is the compression force base element, the second apparatus part is the cargo retention element; if the first apparatus part is the cargo retention element, the second apparatus part may be the compression force base element.

It should be further noted that two primary embodiments of the apparatus as used on a vehicle (e.g., in a truck bed) may appear as inversions of one another. In one such embodiment, the vertical compression force enhancement element may appear towards the bottom of the apparatus, while in the other the vertical compression force enhancement element may appear towards the top of the apparatus. The former embodiment may be described—in terms of terminology used in the claims—upon qualification of the first apparatus part along which first portions of the force transfer elements may be slidingly adjusted as the compression force base element (of course, such portions may be later laterally immobilized in their retention mode lateral positions). The latter embodiment may be described—again, in terms of terminology used in the claims—upon qualification of the first apparatus part along which first portions of the force transfer elements may be slidingly adjusted as the cargo retention element. Both embodiments are, of course, within the ambit of the inventive technology, but due to a likely easier manipulation of the force enhancement element where it is established towards the bottom of the apparatus, such embodiment is preferred.

Further, it should be noted that "approximate retention mode position(s)" is intended to refer to that position of the referenced structure (e.g., the two adjustable releasable vertical compression force transfer elements, or first ends thereof) which is approximately (but different from, although perhaps only very slightly different from) the position that the referenced structure is in after the force enhancement element is operated to enhance the compression force and retain the cargo, but only where, in fact, there is a difference between the two positions. As should be understood, there may be no difference in the lateral position of the first portion of the force transfer elements (that are laterally immobilized so that the force enhancement element can be operated to enhance a force) when the apparatus is in approximate retention mode configuration (FIG. 11) as compared to its retention mode configuration (FIG. 1). Indeed, although the angular configuration of the force transfer elements may change during force enhancement, the lateral positions of their first portions (that slidingly engage a first apparatus part) might not (and do not in a preferred embodiment).

Generally, the term approximate position relates to the "rough" setup of the apparatus, after which the vertical compression force enhancement element may be operated (e.g., by rotating a lever) to enhance the compression force and maintain (perhaps "automatically") that enhanced force to retain cargo during travel. Such lever manipulation may position the apparatus (or a referenced part thereof) from an approximate retention mode position to a retention mode position. The difference in position between the approximate retention mode position and the retention mode position (in reference to a lower end of a force transfer element, e.g.) may be on the order of millimeters, fractions of an inch, or less than two inches. Upon manipulation of the vertical compression force enhancement element, the distance between portions of the compression force transfer elements (e.g., lower portions) may increase (perhaps only one moves away from the other; perhaps both move away from another). Such change in position effects, in a preferred embodiment, an angular displacement of the force transfer elements and, given the aforementioned lateral immobilization (of, e.g., upper ends of the force transfer elements) likely a downward displacement of the vertically compressive cargo retention element. Such downward displacement, however slight (perhaps it is unobservable to the naked eye), effects an increase in the pressure on the cargo established below. It should also be noted that the step of rotating a lever less than one-half (e.g., one-quarter) of a turn may comprise the step of rotating a lever about an axis that is orthogonal to that axis defined by the vertically compressive cargo retention element. It should be noted that at least one embodiment of the inventive technology may achieve a compressive force sufficient to retain cargo held below a cargo retention element by angular displacement of force transfer elements.

In at least one embodiment of the inventive technology, a vehicular cargo retention method may comprise the steps of engaging a vertical compression force base element with at least one vehicle part (e.g., a truck bed sidewall upper lip, including an underside of that lip); establishing a vertically compressive cargo retention element upon vehicular cargo; freely moving a first portion (e.g., a first end) of each of the two adjustable releasable vertical compression force transfer elements to respective retention mode lateral positions; laterally immobilizing the first end of each of the two adjustable releasable vertical compression force transfer elements in a respective retention mode lateral position; and enhancing a vertical compression force acting upon the vehicular cargo by repositioning a lever from a free position (e.g., unopposed to motion in at least one direction by a resisting force such as friction between mating surfaces of a nut and bolt, but including gravity) through a varying torque to a locked position (e.g., as shown in FIG. 1). The term freely moving indicates that movement in at least one direction is entirely unopposed (again, except by perhaps gravity).

In at least one embodiment, the varying torque comprises an initial resisting torque that increases at a first absolute average rate (e.g., ft. lbs/degree of rotation), a threshold, maximum resistant torque, and a subsequent resisting torque that decreases at a second absolute average rate; such second absolute average rate may be less than the first absolute average rate. By absolute is meant the absolute value; by average is meant the average value for the referenced parameter for its entire duration (e.g., the first absolute average rate for the increase in torque would be the average throughout the entire period of increase, but for no longer). The average may be calculated simply by dividing the area under a curve defined by the torque's response to a varying angle of rotation of the lever by the angular "sweep" (e.g., as measured in degrees) observed during that portion of the rotation of the lever that encounters the indicated torque (e.g., resisting or assisting).

The varying torque may further comprise a terminal, assisting torque that assists to position the lever in the locked position. Immediately after rotating the lever through the threshold (the point at which the resisting torque is maximum), the torque that is encountered decreases relatively quickly (at least as compared with the rate of increase). In a preferred embodiment, the torque then, upon passing through zero, changes from a resisting torque to an assisting torque. This assisting torque—perhaps referred to as terminal because it may be the last torque experienced during activation of the compression force enhancement element—may act to "pull" the lever into a locked position, and maintain it in this locked position, during enhancement of the compression force. In the reverse deactivation of the compression enhancement (e.g., by levering a lever in a direction that is opposite that direction through which it is rotated to enhance the force), such assisting force may be a resisting force (and the force that resists during the force enhancement may act to assist lever rotation during the dis-application of the enhanced force).

The torque experienced upon rotating the lever during force enhancement is, in at least one embodiment, not unlike that torque observed by the operator of a Vice Grip® upon "locking" the pliers onto a part to be grasped. Indeed, what may govern the values of the rates of increase or decrease of the torque (whether resisting or assisting), the maximum/minimum values of the torque, and the angular displacements from a free position at which specific torques may occur (e.g., maximum torque, minimum torque, zero torque, the terminal torque—whether zero or assisting) may be, inter alia, the lengths of each the lever and the member of the compression force enhancement element, their relative lengths, the location of their site of pivotal connection, and/or the location of those parts (e.g., that may be established at a site lower than the compression force enhancement element) that may act to obstruct further rotation of a lever of the compression force enhancement element.

FIGS. 12 and 13 show examples of torque profiles representative of differently configured (e.g., having different lengths, sites of pivotal connection, e.g.) compression force enhancement elements. The abscissa $\theta$ is the angular displacement of the lever relative to a "zeroed" $\theta$ value at a free position (just at the point where a resisting torque starts upon rotation of the lever in the appropriate direction), while the ordinate T is the torque. FIG. 12 shows a torque that varies linearly with $\theta$, while FIG. 13 shows a torque that varies non-linearly with $\theta$. Both show a terminal, assisting torque, in addition to an initial, resisting torque that increases at an absolute, average rate that is less than the absolute, average rate of decrease of the subsequent resisting torque, although such is not a required feature of certain embodiments of the inventive technology. As used in FIGS. 12 and 13, the subscripts i, s, and t used to characterize the rates of change of the torque relative to $\theta$ indicate initial, subsequent, and terminal, respectively. Of course, a horizontal bar above a rate indicates an averaged value, while vertical bars on either side of a parameter indicate absolute value. Further, $\theta_{max, Torque}$ represents the angular displacement at which a maximum torque is observed.

It should be understood that although portions of this disclosure may indeed focus on an apparatus intended to retain vehicular cargo (e.g., in a truck bed), this disclosure is also intended to describe apparatus that may find application to retain items in other situations. For example, certain embodiments of the inventive technology may find application as established against a vertical wall. Thus, the disclosure in not necessarily limited to apparatus that apply only a vertical compressive force to retain items, but also a horizontal (or otherly oriented) force.

The inventive technology may include several (e.g., two or more) pivotal connectors 70. Such connectors may be at sites including, but not limited to: upper ends of the force transfer elements; lower ends of the force transfer elements; sites on the slide elements (e.g., carriages) that may slide along the force base element; and sites along the compression force transfer element.

The basic apparatus may further comprise an anti-theft locking device (e.g., a keyed removal system 60). This device may prevent theft of any retained cargo and, indeed, the entire retention apparatus itself. Any of the cargo retention systems of the invention may further comprise cargo netting or a cargo net to further aid in the retention of cargo.

Any parts of the apparatus may be made from a material selected from the group consisting of: metal, steel, aluminum, titanium, carbon fiber, plastic, fiberglass, composite material, or other sufficiently strong and/or rigid material. Further, it should be added that one of ordinary skill in the relevant art could, upon being presented with this disclosure, readily make and use the inventive apparatus disclosed herein.

It should be added that where one element is indicated as "responsive to" a second element, all that is meant is that there is at least one stimulus in the second item that will cause some sort of reaction (perhaps only the transfer of a force, the generation of an internal pressure, the transference of a force, or a movement or rotation) in the first element. It should be further understood that the term vehicle as used herein is not limited to motorized vehicles, and may include non-motorized trailers or any device that is movable under an operator's control and that has a cargo-loadable surface (whether horizontal or otherwise).

As can be easily understood from the foregoing, the basic concepts of the present inventive technology may be embodied in a variety of ways. It involves both cargo retention techniques as well as devices to accomplish the appropriate cargo retention. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this non-provisional application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "connector" should be understood to encompass disclosure of the act of "connecting"—whether explicitly discussed or not—and, conversely, were there effectively disclosure of the act of "connecting", such a disclosure should be understood to encompass disclosure of a "connector" and even a "means for connecting" Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information statement filed with the application are hereby appended and hereby incorporated by reference, however, as to each of the above, to the extent that such information or statements incorporated by reference might be considered inconsistent with the patenting of this/these inventive technology(s) such statements are expressly not to be considered as made by the applicant(s).

Thus, the applicant(s) should be understood to have support to claim and make a statement of inventive technology to at least: i) each of the processing devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventive technologys, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

In addition and as to computer aspects and each processing aspect amenable to programming or other electronic automation, the applicant(s) should be understood to have support to claim and make a statement of inventive technology to at least: xii) processes performed with the aid of or on a computer as described throughout the above discussion, xiv) a programmable apparatus as described throughout the above discussion, xv) a computer readable memory encoded with data to direct a computer comprising means or elements which function as described throughout the above discussion, xvi) a computer configured as herein disclosed and described, xvii) individual or combined subroutines and programs as herein disclosed and described, xviii) the related methods disclosed and described, xix) similar, equivalent, and even implicit variations of each of these systems and methods, xx) those alternative designs which accomplish each of the functions shown as are disclosed and described, xxi) those alternative designs and methods which accomplish each of the functions shown as are implicit to accomplish that which is disclosed and described, xxii) each feature, component, and step shown as separate and independent inventive technologies, and xxiii) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A vehicular cargo retention apparatus reconfigurable between a free, non-compression configuration and a locked, vehicular cargo compressive retention configuration, and comprising:

two adjustable releasable vertical compression force transfer elements, each of said force transfer elements comprising first and second ends, each of said force transfer elements established between a first horizontal, elongated structural element and a second horizontal, elongated structural element, and each of said second ends slidingly engaged with at least a portion of said second horizontal, structural element when said apparatus is in said free, non-compression configuration;

two lateral immobilization devices that adjustably, releasably connect said first ends of said two adjustable releasable vertical compression force transfer elements with said first, horizontal, elongated structural element, said first ends slidingly engaged with at least a portion of said first horizontal, structural element when said apparatus is in said free, non-compression configuration and capable of being immobilized in a desired position upon operation of said two lateral immobilization devices;

two engagement elements that each are configured to releasably attach said apparatus to at least one vehicle part; and a lever:
pivotally connected with and substantially between said second ends of said two adjustable releasable vertical compression force transfer elements,
pivotable about a lever horizontal axis, and
configured to enable reconfiguration of said apparatus from said free, non-compressive configuration to said locked, vehicular cargo compressive retention configuration via activation of said lever by manual application of a torque to rotate said lever about said lever horizontal axis and thereby apply a vertical compressive force that retains said vehicular cargo,
wherein, during said activation of said lever, said torque passes through a threshold, maximum resistant torque, then passes through a zero torque, and then becomes a terminal, assisting torque.

2. A vehicular cargo retention apparatus as described in claim 1 wherein said first ends of said two adjustable releasable vertical compression force transfer elements that slidingly engage at least a portion of said first horizontal, structural element when said apparatus is in said free, non-compression configuration are upper ends.

3. A vehicular cargo retention apparatus as described in claim 1 wherein said two engagement elements comprise clamp engagement elements.

4. A vehicular cargo retention apparatus as described in claim 1 wherein said second ends slidingly engage at least a portion of said second horizontal, structural element at two sites when said apparatus is in said free, non-compression configuration.

5. A vehicular cargo retention apparatus as described in claim 1 wherein said vehicular cargo retention apparatus, after being fixedly established to said vehicle, can be disengaged from said vehicle upon manipulation of said lever to remove said vertical compressive force that retains cargo.

6. A vehicular cargo retention apparatus as described in claim 1 wherein said at least one vehicle part comprises upper portions of two truck bed sidewalls.

7. A vehicular cargo retention apparatus as described in claim 1 wherein said lever is operable with one hand.

8. A vehicular cargo retention apparatus as described in claim 1 wherein said lever and said two adjustable releasable vertical compression force transfer elements are laterally adjustable.

9. A vehicular cargo retention apparatus as described in claim 1 wherein each of said two adjustable releasable vertical compression force transfer elements are lockable in a desired position relative to said first horizontal, elongated structural element.

10. A vehicular cargo retention apparatus as described in claim 1 wherein said lever, upon activation, increases a lateral distance between two sites at which said two adjustable releasable vertical compression force transfer elements are engaged.

11. A vehicular cargo retention apparatus as described in claim 1 further comprising an anti-theft element.

12. A vehicular cargo retention apparatus as described in claim 1 wherein said first horizontal, elongated structural element is a lower, horizontal, elongated structural element.

13. A vehicular cargo retention apparatus as described in claim 1 wherein said first horizontal, elongated structural element is an upper, horizontal, elongated structural element.

14. A vehicular cargo retention apparatus as described in claim 1 wherein said second horizontal, elongated structural element is a vertically compressive cargo retention element.

15. A vehicular cargo retention apparatus as described in claim 1 wherein said engagement elements are each disposed at an end of said first horizontal, elongated structural element.

16. A vehicular cargo retention apparatus as described in claim 1 wherein said lever is pivotally connected with and substantially between lower ends of said two adjustable releasable vertical compression force transfer elements.

17. A vehicular cargo retention apparatus as described in claim 1 wherein said second horizontal, elongated structural element defines a second horizontal, longitudinal structural element axis and said lever horizontal axis is orthogonal to said second horizontal, longitudinal structural element axis.

18. A vehicular cargo retention apparatus as described in claim 1 wherein said first ends of said two adjustable releasable vertical compression force transfer elements are upper ends and said second ends of said two adjustable releasable vertical compression force transfer elements are lower ends.

19. A vehicular cargo retention apparatus as described in claim 1 wherein said first ends of said two adjustable releasable vertical compression force transfer elements are lower ends and said second ends of said two adjustable releasable vertical compression force transfer elements are upper ends.

20. A vehicular cargo retention apparatus comprising:
  two engagement elements that each are configured to respond to at least one vehicle part;
  a vertical compression force base element responsive to each of said two engagement elements;
  two adjustable releasable vertical compression force transfer elements, each of said force transfer elements comprising an upper and lower end, and each of said force transfer elements pressuredly responsive to said vertical compression force base element;
  two lateral immobilization devices that adjustably, releasably connect said upper ends of said two adjustable releasable vertical compression force transfer elements with said vertical compression force base element;
  a vertically compressive cargo retention element pressuredly responsive to each of said adjustable releasable vertical compression force transfer elements, said vertically compressive cargo retention element defining a longitudinal, vertically compressive cargo retention element horizontal axis; and
  a handled lever to which said vertically compressive cargo retention element is compressively responsive, said handled lever:
    pivotally connected with and substantially between said lower ends of said two adjustable releasable vertical compression force transfer elements,
    pivotable about a lever horizontal axis that is orthogonal to said longitudinal, vertically compressive cargo retention element horizontal axis, and
    enabling reconfiguration of said apparatus from a free, non-compressive configuration, to a locked, vehicular cargo compressive retention configuration via activation of said lever by manual application of a torque to rotate said handled lever about said lever horizontal axis;
  wherein, during activation of said handled lever, said torque passes through a threshold, maximum resistant torque, then passes through a zero torque, and then becomes a terminal, assisting torque,
  wherein, when said apparatus is in said free, non-compressive configuration, said upper ends of said two adjustable, releasable vertical compression force transfer elements slidingly engage at least a portion of said vertical compression force base element, and
  wherein, when said apparatus is in said free, non-compressive configuration, said lower ends of said two adjustable, releasable vertical compression force transfer members slidingly engage at least a portion of said vertically compressive cargo retention element.

* * * * *